United States Patent
Windisch et al.

(10) Patent No.: US 6,734,257 B2
(45) Date of Patent: May 11, 2004

(54) BLOCK COPOLYMER BASED ON CONJUGATED DIOLEFINS AND POLAR MONOMERS

(75) Inventors: Heike Windisch, Leverkusen (DE); Werner Obrecht, Moers (DE); Cristina Stere, Leverkusen (DE); Thomas Scholl, deceased, late of Gladbach (DE), by Ulrike Scholl, Philipp Scholl, Christine Scholl, Johannes Scholl, legal representatives; Oskar Nuyken, München (DE); Lars Friebe, München (DE); Mario Vierle, München (DE)

(73) Assignee: Bayer Aktiengesellschaft, Leverkusen (DE)

( * ) Notice: Subject to any disclaimer, the term of this patent is extended or adjusted under 35 U.S.C. 154(b) by 24 days.

(21) Appl. No.: 10/102,761

(22) Filed: Mar. 21, 2002

(65) Prior Publication Data

US 2002/0183467 A1 Dec. 5, 2002

(30) Foreign Application Priority Data

Mar. 27, 2001 (DE) .......................................... 101 15 106

(51) Int. Cl.⁷ ........................... C08L 53/00; C08F 36/04

(52) U.S. Cl. ....................... 525/314; 525/177; 525/178; 525/87; 525/92 B; 525/92 H; 525/329.9; 525/330.5; 525/327.2; 525/327.3

(58) Field of Search ................................ 525/314, 177, 525/178, 87, 92 B, 92 H, 329.9, 330, 5, 327.2, 327.3

(56) References Cited

U.S. PATENT DOCUMENTS

| | | | |
|---|---|---|---|
| 4,242,232 A | 12/1980 | Sylvester et al. | ....... 252/429 C |
| 4,260,707 A | 4/1981 | Sylvester et al. | ............ 526/114 |
| 4,429,089 A | 1/1984 | Pedretti et al. | .............. 526/153 |
| 4,436,884 A | 3/1984 | Carbonaro et al. | .......... 526/111 |
| 4,444,903 A | 4/1984 | Carbonaro et al. | .......... 502/102 |
| 4,525,549 A | 6/1985 | Carbonaro et al. | ........... 526/92 |
| 4,699,960 A | 10/1987 | Gordini et al. | ................ 526/81 |
| 5,627,119 A | 5/1997 | Biagini et al. | .............. 502/152 |
| 5,633,353 A | 5/1997 | Garbassi et al. | .............. 534/15 |
| 5,659,101 A | 8/1997 | Biagini et al. | .............. 585/601 |
| 5,686,371 A | 11/1997 | Ansell et al. | ................ 502/102 |
| 5,807,944 A | * 9/1998 | Hirt et al. | .................... 526/279 |

FOREIGN PATENT DOCUMENTS

| | | |
|---|---|---|
| CA | 1 143 711 | 3/1983 |
| EP | 0 298 667 | 1/1989 |
| EP | 0 431 706 | 6/1991 |
| GB | 821971 | 10/1959 |

OTHER PUBLICATIONS

Quirk R P et al: "Butadiene polmerization using neodymium versatate–based catalysts: catalyst optimization and effects of water and excess versatic acid" Polymer. Elsevier Science Publishers B V, GB, Bd. 41, Nr. 15, Jul. 2000, Seiten 5903–5908, XP004193905 ISSN:0032–3861 the whole document.

Kroschwitz Jaueline, Howe–Grant Mary: "Kirk Othmer Encyclopedia of Chemical Technology, vol. 9: Elastomers, synthetic: Polyisoprene", John Wiley & Sons, New York 1994 XP002205150 Seite 1–Seite 9; Tabelle 2.

Journal Of Organormetallic Chemistry, 574, (month unavailable) 1999, pp. 40–49, "Catalytic activity of allyl–, azaallyl– and diaza–pentadienyllanthanide complexes for polymerization of methyl methacrylate" by lhara et al.

Macromolecules, (month unavailabel) 1995, 28, pp. 7886–7892, "Living Polymerizations and Copolymerizations of Alkyl Acrylates by the Unique Catalysis of Rare Earth Metal Complexes" by Ihara et al.

Prog. Polym. Sci., 25, (month unavailable) 2000, pp. 573–626, "Organo transition metal initiated living polymerizations" by H. Yasuda.

Macromolecules, (month unavailable) 1992, 25, pp. 5115–5116, "New Approach to Block Copolymerizations of Ethylene and Alkyl Methacrylates and Lactones by Unique Catalysis with Organolanthanide Complexes" by H. Yasuda et al.

Z Anal. Chem., 181, (month unavailable) 1961, pp. 229–243, "Beitrag zur infrarotspektroskopischen Simultananalyse" by E. O. Schmalz und W. Kimmer.

Macromolecules, (month unavailable) 1995, 28, pp. 7886–7892, "Living Polymerizations and Copolymerizations of Alkyl Acrylates by the Unique Catalysis of Rare Earth Metal Complexes" by Eiji Ihara et al.

J. Am. Chem. Soc., 114, (month unavailable) 1992, pp. 4908–4910 and Supplementary Materials, "Synthesis of Monodispresed High Molecular Weight Polymers and Isolation of an Organolanthanthanide (III) Intermediate Coordinated by a Penultimate Poly(MMA) Unit" by Hajime Yasuda et al.

(List continued on next page.)

*Primary Examiner*—Rabon Sergent
*Assistant Examiner*—Olga Asinovsky
(74) *Attorney, Agent, or Firm*—Joseph C. Gil; Noland J. Cheung; Jennifer R. Seng

(57) ABSTRACT

The block copolymers according to the invention which are based on conjugated diolefins and polar monomers and are prepared in the presence of catalysts based on the rare earth metals have a high cis-1,4 content in the polydiene block and, because of their polar polymer part and their non-polar diene polymer part, can be used as agents which impart compatibility in the preparation of vulcanizates with a filler content for the production of tires and tire component in the preparation of thermoplastic elastomers or in the modification of thermoplastics.

5 Claims, 1 Drawing Sheet

OTHER PUBLICATIONS

Macromolecules, (month unavailable) 1996, 29, pp. 1798–1806, "Organolanthanide–Initiated Living Polymerizations of ε–Caprolactone, δ–Valerolactone, and β–Propiolactone" by M. Yamashita et al.

Macromolecules, (month unavailable) 1993, 26, pp. 7134–7143, Synthesis of High Molecular Weight Poly(methyl Methacrylate) with extremely low Polydispersity by the Unique Function of Organolanthanide (III) Complexes by H. Yasuda et al.

J. Polym. Sci., Polym. Chem. Ed., 32, (month unavailable) 1994, pp. 597–603, "Ring–Opening Polymerization of ε–Caprolactone Polymerization with Nd (acac)$_3$.3H$_2$O–AlEt$_3$ System" by Z. Shen et al.

Prog. Polym. Sci., vol. 18, pp. 1097–1139, (month unavailable) 1993, "Characteristics of Rare Earth Systems As Polymerization Initiators" by H. Yasuda and H. Tamai.

* cited by examiner

*Figure 1:* TEM photograph of a PB/PCL mixture (weight content of PCL = 62%) after dissolving in $CHCl_3$ and precipitation. Contrasted by $OsO_4$, ultra-thin section. Dark regions: PB, grey regions: PCL, white regions: holes. Bar length: 10 μm.

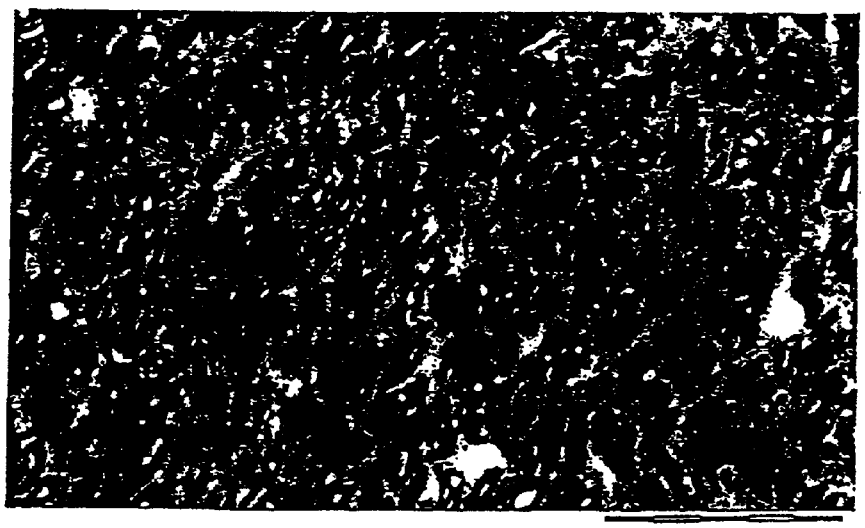

*Figure 2:* TEM photograph of the polymer at the phase boundary isolated by FEEF (weight content of PCL = 70%, contains PB-*block*-PCL). Contrasted by $OsO_4$, ultra-thin section. Dark regions: PB, light regions: PCL.

BLOCK COPOLYMER BASED ON CONJUGATED DIOLEFINS AND POLAR MONOMERS

FIELD OF THE INVENTION

The present invention relates to a block copolymer based on conjugated diolefins and polar monomers, and to a process for the preparation of the block copolymer in the presence of catalysts of the rare earths.

BACKGROUND OF THE INVENTION

The polymerization of conjugated diolefins has been known for a long time and is described, for example, by W. Hoffman, Rubber Technology Handbook, Hanser Publishers (Carl Hanser Verlag) Munich, Vienna, N.Y., 1989. Thus, for example, polybutadiene is now predominantly prepared by solution polymerization with the aid of coordination catalysts of the Ziegler-Natta type, for example based on compounds of titanium, cobalt, nickel and neodymium, or in the presence of alkyllithium compounds. The nature of the solvent used in each case depends greatly on the type of catalyst employed. Benzene or toluene and aliphatic or cycloaliphatic hydrocarbons are preferably employed.

The polymerization of unsaturated organic compounds, in particular conjugated dienes, in the presence of catalysts based on rare earth metals has been known for a long time (see e.g. DE-A 28 33 721, U.S. Pat. No. 4,429,089, EP-A 76 535, EP-A 92 270, EP-A 92 271, EP-A 207 558, WO-A 93/05083, U.S. Pat. No. 5,627,119, EP-A 667 357, U.S. Pat. No. 3,478,901, EP-A 637 589). Thus, for example, EP-A 11 184 and EP-A 7027 disclose a catalyst system which is based on rare earth metals, in particular based on neodymium compounds, and is particularly suitable for the polymerization of conjugated dienes, in particular butadiene. In the polymerization of, for example, butadiene, these catalysts give a polybutadiene in very good yields and with a high selectivity, which is distinguished, in particular, by a high content of cis-1,4 units.

It is, furthermore, known to employ anionic initiators, such as butyllithium, for the polymerization of butadiene in hexane. Anionic catalysts are also suitable for a block copolymerization of butadiene with further non-polar monomers, such as styrene and isoprene, or polar monomers, such as ethylene oxide, propylene oxide and acrylates [H. L. Hsieh, R. P. Quirk, Marcel Dekker Inc., New York—Basel, 1996; R. K. Sadhir, R. M. Luck, Expanding Monomers, CRC Press Boca Raton, 1992]. In this case, the butadiene is first polymerized in an inert solvent and, after addition of a further-monomer to the live system, a second block is then formed from the further monomer. The preparation of three-block copolymers is also possible with these anionic initiators.

The disadvantage is that it is not possible, with anionic initiators, to prepare a copolymer with a high cis content, in which the cis-1,4 content of the butadiene block is above 50%, under conditions which are relevant in use.

It is known that compounds for tire mixtures, in particular for treads, are made of several rubbers and fillers in order to achieve an optimum in their properties, such as e.g. the rolling resistance and the abrasion and wet skidding resistance. Polydienes with a high cis content, such as the two synthetic rubbers, polybutadiene and polyisoprene or natural rubber, are preferably employed in these rubbers.

To reduce the rolling resistance, some of the filler carbon black in the "green tires" is replaced by silica. One of the main problems of using silica as a filler in rubber is the great difference in polarity between the two components. This results in a poor miscibility. Binding of polar silica to the non-polar rubber matrix has hereto been achieved only by means of coupling reagents, such as e.g. Si-69® (Degussa AG).

However, for use of the block copolymer as an agent which imparts compatibility of, for example, high cis-BR and silica in vulcanizate mixtures, a low cis-1,4 content in the polydiene part of the block copolymer has an adverse effect on the compatibility of the block copolymer with the high cis-BR rubber matrix and therefore, an adverse effect on the product properties.

In the case of catalysts based on the rare earths, those catalyst systems which allow homopolymerization of polar monomers are also described. Examples of these are the samarium catalyst $[(C_5Me_5)SmH]_2$ for the polymerization of acrylates [H. Yasuda et al., Macromolecules, 1993, 22,7134; J. Am. Chem. Soc., 1992, 114, 4908; E. Ihara et al., Macromolecules, 1995, 28, 7886] and lactones [M. Yamashita et al., Macromolecules, 1996, 29, 1798] and for the block copolymerization of ethylene with methacrylate or ε-caprolactone [H. Yasuda et al., Macromolecules, 1992,25, 5115], the samarium catalyst $[(C_5Me_5)_{25} mMe]$ for the formation of tri-block copolymers from variously substituted acrylates [E. Ihara et al., Macromolecules, 1995, 28, 7886] and for the polymerization of cyclic carbonates [H. Yasuda, Prog. Polym. Sci., 2000, 25, 573], the ytterbium catalyst $Yb[C(SiMe_3)_3]_2$ for the polymerization of methacrylate [H. Yasuda et al., Prog. Polym. Sci., 1993,18,1097; E. Ihara et al., J. Organomet. Chem., 1999, 574, 40] and neodymium catalysts based on $Nd(acac)_3(H_2O)3/AlR_3$ and $Nd(naphthenate)3/AlR_3$ for the polymerization of lactones [Z. Shen et al., J: Polym. Sci., Polym. Chem. Ed., 1994, 32, 597] and based on $Nd(ethyl\ acetoacetate)_2(OPr)$ for the block copolymerization of cyclic carbonate with lactones [H. Yasuda, Prog. Poly. Sci., 2000, 25, 573].

The preparation of block copolymers with a high cis-1,4-polydiene part and therefore, a low glass transition temperature has not so far been possible.

SUMMARY OF THE INVENTION

The object of the present invention was to provide a process for the block copolymerization of conjugated diolefins and polar monomers with which copolymers in which the polymer composition can be varied with respect to the content of conjugated dienes and of polar monomers, at an unchanged high cis-1,4 content in the polydiene content of ≧60%, are obtained.

BRIEF DESCRIPTION OF THE DRAWINGS

FIG. 1 shows TEM photograph of a PB/PCL mixture (weight content of PCL=62%) after dissolving in $CHCl_3$ and precipitation. Contrasted by $OsO_4$, ultra-thin section. Dark regions: PB, grey regions: PCL, white regions: holes. Bar length: 10 μm.

FIG. 2 shows a TEM photograph of the polymer at the phase boundary isolated by FEEF (weight content of PCL= 70%, contains PB-block-PCL). Contrasted by $OsO_4$, ultra-thin section. Dark regions: PB, light regions: PCL.

DETAILED DESCRIPTION OF THE INVENTION

The present invention relates to a process for the block copolymerization of conjugated diolefins and polar monomers with which copolymers in which the polymer composition can be varied with respect to the content of conjugated dienes and of polar monomers, at an unchanged high cis-1,4 content in the polydiene content of ≧60%, preferably ≧80%, more preferably ≧90%, are obtained.

With the catalyst systems according to the present invention described in more detail below, there is the possibility of preparing a block copolymer in which the content of polymerized dienes and polar monomers can be adjusted within a wide range at an unchanged high cis-1,4 content of the polydiene. These block copolymers with a high cis content are not possible with the known catalyst systems used in the art which are based on lithium-alkyls.

With the catalyst systems employed according to the present invention, it is, therefore, possible to establish a high cis-1,4 content in the polydiene content, in order to achieve in this manner, an optimum compatibility with the rubbers of high cis content employed, while also, via establishing of a suitable ratio of polymerized dienes and of polymerized polar monomers, to ensure optimum binding of the rubber mixture to polar components, which manifests itself in low abrasion and a long life in the industrial use of the mixtures.

The present invention, therefore, provides a block copolymer based on conjugated dienes and polar monomers, which is characterized in that it comprises the polymerized conjugated dienes in amounts of 5 to 95 wt. % and the polymerized polar monomers in amounts of 95 to 5 wt. %, the polydienes having a cis-1,4 content of ≧60%.

Preferably, the amount of dienes is 20 to 90 wt. % and the amount of polar monomers is 10 to 80 wt. %, the polydienes having a cis-1,4 content of ≧80%, preferably ≧90%.

The present invention also provides a process for the preparation of block copolymers based on conjugated dienes and polar monomers, which is characterized in that conjugated dienes are polymerized in the presence of catalysts comprising A) at least one compound of the rare earth metals,
B) at least one organoaluminum compound and
C) at least one Lewis acid and in the presence of inert organic solvents up to a conversion of ≧50%, preferably ≧70%, polar monomers are then added to the polymerization mixture and polymerization is carried out up to a conversion of ≧30%, preferably ≧50%, and the resulting block copolymer is then isolated, the conjugated dienes being employed in the reaction mixture in amounts of 5 to 30 wt. %, preferably 10–20 wt. %, and the polar monomers in amounts of 1 to 30 wt. %, preferably 5–20 wt. %.

The molar ratio in which catalyst components (A) to (C) are employed can be varied within wide limits. The molar ratio of component (A) to component (B) is 1:1 to 1:1,000, preferably 1:3 to 1:200, more preferably 1:3 to 1:100. The molar ratio of component (A) to component (C) is 1:0.2 to 1:15, preferably 1:0.4 to 1:5, more preferably 1:0.5 to 1:3. If alumoxanes are used as component (B), all or some of component (C) can be dispensed with.

Possible compounds of the rare earth metals (component (A)) are, in particular, those which are chosen from:
an alcoholate of the rare earth metals,
a phosphonate, phosphinates and/or phosphates of the rare earth metals,
a carboxylate of the rare earth metals,
a complex compound of the rare earth metals with diketones
an addition compound of the halides of the rare earth meals with an oxygen or nitrogen donor compound and/or
an allyl compound of the rare earth metals.

The above-mentioned compounds of the rare earth metals are described in more detail, for example, in EP-B-01 1184 and WO 96/31544.

The compounds of the rare earth metals are based, in particular, on the elements with the atomic numbers 21, 39 and 57 to 71. Rare earth metals which are preferably employed are lanthanum, praseodymium or neodymium or a mixture of elements of the rare earth metals which comprises at least one of the elements lanthanum, praseodymium or neodymium to the extent of at least 10 wt. %. Lanthanum or neodymium are preferably employed as rare earth metals, and these, in turn, can be mixed with other rare earth metals. The content of lanthanum and/or neodymium in such a mixture is preferably at least 30 wt. %.

Possible alcoholates, phosphonates, phosphinates, phosphates and carboxylates of the rare earth metals or possible complex compounds of the rare earth metals with diketones are, in particular, those in which the organic group contained in the compound contains, in particular, straight-chain or branched alkyl radicals having 1 to 20 carbon atoms, preferably 1 to 15 carbon atoms, such as methyl, ethyl, n-propyl, n-butyl, n-pentyl, isopropyl, isobutyl, tert-butyl, 2-ethylhexyl, neo-pentyl, neo-octyl, neo-decyl or neo-dodecyl.

Alcoholates of the rare earths which are mentioned are e.g.: neodymium(III) n-propanolate, neodymium(III) n-butanolate, neodymium(III) n-decanolate, neodymium (III) iso-propanolate, neodymium(III) 2-ethyl-hexanolate, praseodymium(III) n-propanolate, praseodymium(III) n-butanolate, praseodymium(III) n-decanolate, praseodymium(III) isopropanolate, praseodymium(III) 2-ethyl-hexanolate, lanthanum(III) n-propanolate, lanthanum(III) n-butanolate, lanthanum(III) n-decanolate, lanthanum(III) iso-propanolate and lanthanum(III) 2-ethyl-hexanolate, preferably neodymium(III) n-butanolate, neodymium(III) n-decanolate and neodymium(III) 2-ethyl-hexanolate.

Phosphonates, phosphinate and phosphates of the rare earths which are mentioned are e.g.: neodymium(III) dibutylphosphonate, neodymium(III) dipentylphosphonate, neodymium(III) dihexylphosphonate, neodymium(III) diheptylphosphonate, neodymium(III) dioctylphosphonate, neodymium(III) dinonylphosphonate, neodymium(III) didodecylphosphonate, neodymium(III) dibutylphosphinate, neodymium(III) dipentylphosphinate, neodymium(III) dihexylphosphinate, neodymium(III) diheptylphosphinate, neodymium(III) dioctylphosphinate, neodymium(III) dinonylphosphinate and neodymium(III) didodecylphosphinate, preferably neodymium(III) dioctylphosphonate and neodymium(III) dioctylphosphinate.

Carboxylates of the rare earth metals which are suitable are: lanthanum(III) propionate, lanthanum(III) diethylacetate, lanthanum(III) 2-ethylhexanoate, lanthanum (III) stearate, lanthanum(III) benzoate, lanthanum(III) cyclohexanecarboxylate, lanthanum(III) oleate, lanthanum (III) versatate, lanthanum(III) naphthenate, praseodymium (III) propionate, praseodymium(III) diethylacetate, praseodymium(III) 2-ethylhexanoate, praseodymium(III) stearate, praseodymium(III) benzoate, praseodymium(III) cyclohexanecarboxylate, praseodymium(III) oleate, praseodymium(III) versatate, praseodymium(III) naphthenate, neodymium(III) propionate, neodymium(III) diethylacetate, neodymium(III) 2-ethylhexanoate, neodymium(III) stearate, neodymium(III) benzoate, neodymium(III) cyclohexanecarboxylate, neodymium(III) oleate, neodymium(III) versatate and neodymium(III)

naphthenate, preferably neodymium(III) 2-ethylhexanoate, neodymium(III) versatate and neodymium(III) naphthenate. Neodymium versatate is preferred.

Complex compounds of the rare earth metals with diketones which may be mentioned are:
lanthanum(III) acetylacetonate, praseodymium(III) acetylacetonate and neodymium(III) acetylacetonate, preferably neodymium(III) acetylacetonate.

Addition compounds of the halides of the rare earth metals with an oxygen or nitrogen donor compound which are mentioned are, for example:
lanthanum(III) chloride with tributyl phosphate, lanthanum (III) chloride with tetrahydrofuran, lanthanum(III) chloride with iso-propanol, lanthanum(III) chloride with pyridine, lanthanum(III) chloride with 2-ethylhexanol, lanthanum(III) chloride with ethanol, praseodymium(III) chloride with tributyl phosphate, praseodymium(III) chloride with tetrahydrofuran, praseodymium(III) chloride with iso-propanol, praseodymium(III) chloride with pyridine, praseodymium(III) chloride with 2-ethylhexanol, praseodymium(III) chloride with ethanol, neodymium(III) chloride with tributyl phosphate, neodymium(III) chloride with tetrahydrofuran, neodymium(III) chloride with iso-propanol, neodymium (III) chloride with pyridine, neodymium(III) chloride with 2-ethylhexanol, neodymium(III) chloride with ethanol, lanthanum(III) bromide with tributyl phosphate, lanthanum(III) bromide with tetrahydrofuran, lanthanum (III) bromide with isopropanol, lanthanum(III) bromide with pyridine, lanthanum(III) bromide with 2-ethylhexanol, lanthanum(III) bromide with ethanol, praseodymium(III) bromide with tributyl phosphate, praseodymium(III) bromide with tetrahydrofuran, praseodymium(III) bromide with isopropanol, praseodymium(III) bromide with pyridine, praseodymium(III) bromide with 2-ethylhexanol, praseodymium(III) bromide with ethanol, neodymium (III) bromide with tributyl phosphate, neodymium(III) bromide with tetrahydrofuran, neodymium(III) bromide with isopropanol, neodymium(III) bromide with pyridine, neodymium(III) bromide with 2-ethylhexanol and neodymium(III) bromide with ethanol, preferably lanthanum(III) chloride with tributyl phosphate, lanthanum(III) chloride with pyridine, lanthanum(III) chloride with 2-ethylhexanol, praseodymium(III) chloride with tributyl phosphate, praseodymium(III) chloride with 2-ethylhexanol, neodymium(III) chloride with tributyl phosphate, neodymium(III) chloride with tetrahydrofuran, neodymium(III) chloride with 2-ethylhexanol, neodymium(III) chloride with pyridine, neodymium(III) chloride with 2-ethylhexanol and neodymium(III) chloride with ethanol.

Possible allyl compounds of the rare earth metals (component (A)) are, in particular, those which are chosen from the tetra(allyl) complexes of the rare earths of the formula (I) $[M(D)_n]^+[Ln(C_3R_5)_4]^-$, tris(allyl) complexes of the rare earths of the formula (II) $Ln(C_3R_5)_3(D)_n$, bis(allyl) complexes of the rare earths of the formula (III) $Ln(C_3R_5)_2(X)(D)_n$ and mono(allyl) complexes of the rare earths of the formula (IV) $Ln(C_3R_5)(X)_2(D)_n$, wherein Ln denotes a trivalent element of the rare earths with the atomic numbers 21, 39 and 57 to 71, X is identical or different and denotes an anion, D is identical or different and denotes a neutral ligand, M represents an element of group Ia of the periodic table of the elements (PTE) [F. A. Cotton, G. Wilkinson, Anorganische Chemie [Inorganic Chemistry], 4th edition, VCH Verlagsgesellschaft mbH, Weinheim, 1985], R is identical or different and represents hydrogen, represents a linear or branched, saturated or mono- or polyunsaturated $C_1$–$C_{30}$-alkyl radical or $C_5$–$C_{30}$-cycloalkyl radical, which can optionally contain one or more heteroatoms, such as N, P, O or S, represents a $C_6$–$C_{30}$-aryl radical which optionally contains one or more heteroatoms and is optionally mono- or polysubstituted by alkyl, alkinyl or alkenyl radicals having 1 to 30 C atoms or phenyl groups having 6 to 30 carbon atoms and can be fused with other aromatic radicals containing 6 to 30 carbon atoms, or represents a silyl group substituted by alkyl, alkenyl or alkinyl groups having 1 to 30 C atoms or phenyl groups having 6 to 30 C atoms, n represents any desired number from 0 to 10, preferably 0 to 5.

Examples of compounds of the formula (I) to (IV) are π-allyl complexes of a trivalent element of the rare earths, such as e.g. the allyl compounds already described in WO 96/31544.

The following allyl compounds are particularly suitable: $Nd(C_3H_5)_3(O_2C_4H_8)$, $Nd(C_3H_5)_3$, $La(C_3H_5)_3$, $C_5Me_5*La(C_3H_5)_2$, $C_5H_5La(C_3H_5)_2$, $C_5Me_5Nd(C_3H_5)_2$, $C_5H_5Nd(C_3H_5)_2$, $La(C_3H_5)_2Cl(THF)_2$, $Nd(C_3H_5)_2Cl(THF)_2$, $La(C_3H_5)_2Br(THF)_2$, $La(C_3H_5)_2I(THF)_2$, $La(C_3H_5)Cl_2(THF)_2$, $Nd(C_3H_5)Cl_2(THF)_2$, $La(C_3H_5)Br_2(THF)_3$ and $Nd(C_3H_5)Br_2(THF)_2$.

Neodymium versatate, neodymium octanoate and/or neodymium naphthenate are preferably employed as compounds of the rare earth metals.

The above-mentioned compounds of the rare earth metals can be employed both individually and as a mixture with one another.

Organoaluminum components (B) which are employed are compounds chosen from an aluminum-trialkyl, a dialkylaluminum hydride and/or an alumoxane of the formulae (I)–(IV):

In the formulae (I) to (IV) of component (B), R can be identical or different and can denote straight-chain and branched alkyl radicals having 1 to 10 C atoms, preferably 1 to 4 C atoms, cycloalkyl radicals having 3 to 20 C atoms and aryl radicals having 6 to 20 C atoms and n can denote 1 to 50.

Examples of suitable aluminum-alkyls of the formulae (i) and (II) are:
trimethylaluminum, triethylaluminum, tri-n-propylaluminum, triisopropylaluminum tri-n-butylaluminum, triisobutylaluminum, tripentylaluminum, trihexylaluminum, tricyclohexylaluminum, trioctylaluminum, diethylaluminum hydride, di-n-butylaluminum hydride and di-iso-butylaluminum hydride. Triethylaluminum, triisobutylaluminum and di-iso-butylaluminum hydride are preferred.

Examples of alumoxanes (III) and (IV), which are mentioned are:
methylalumoxane, ethylalumoxane and iso-butylalumoxane, preferably methylalumoxane and iso-butylalumoxane.

The aluminum-alkyls can be employed individually or as a mixture with one another.

So-called Lewis acids are employed as component (C). Examples which may be mentioned are the organometallic halides in which the metal atom belongs to group 3a) or 4a), and halides of elements of group 3a), 4a) and 5a) of the periodic table as described in "Handbook of Chemistry and Physics", 45th Edition 1964–65.

Compounds, which are mentioned in particular are: methylaluminum dibromide, methylaluminum dichloride, ethylaluminum dibromide, ethylaluminum dichloride, butylaluminum dibromide, butylaluminum dichloride, dimethylaluminum bromide, dimethylaluminum chloride, diethylaluminum bromide, diethylaluminum chloride, dibutylaluminum bromide, dibutylaluminum chloride, methylaluminum sesquibromide, methylaluminum sesquichloride, ethylaluminum sesquibromide, ethylaluminum sesquichloride, aluminum tribromide, antimony trichloride, antimony pentachloride, silicon tetrachloride, methyltrichlorosilane, dimethyidichlorosilane, trimethylchlorosilane, ethyltrichlorosilane, diethyldichlorosilane, triethylchlorosilane, vinyltrichlorosilane, divinyidichlorosilane, trivinylchlorosilane, phosphorus trichloride, phosphorus pentachloride and tin tetrachloride.

Diethylaluminum chloride, ethylaluminum sesquichloride, ethylaluminum dichloride, diethylaluminum bromide, ethylaluminum sesquibromide and/or ethylaluminum dibromide are preferably employed.

The reaction products of aluminum compounds such as are described as component (B) with halogens or halogen compounds, e.g. triethylaluminum with bromine or triethylaluminum with butyl chloride, can also be employed as component (C). In this case, the reaction can be carried out separately, or the amount of alkylaluminum compound required for the reaction is added to the amount required as component (B).

Ethylaluminum sesquichloride, butyl chloride and butyl bromide are preferred.

If the alumoxanes (III) and (IV) are used as component (B), all or some of component (C) can be dispensed with, as already mentioned above.

It is also possible, additionally, to add a further component (D) to the proven catalyst components (A) to (C). This component (D) can be a conjugated diene, which can be the same diene as is to be polymerized later with the catalyst. Butadiene and/or isoprene are preferably used.

If component (D) is added to the catalyst, the amount of (D) is preferably 1 to 1,000 mol per 1 mol of component (A), more preferably 1 to 100 mol. 1 to 50 mol, per 1 mol of component (A), of (D) are preferably employed.

In the preparation of the rubber solutions, the catalysts are employed in amounts of 1 μmol to 10 mmol, preferably 10 μmol to 5 mmol, of the compound of the rare earth metals per 100 g of the monomers.

It is, of course, also possible to employ the catalysts as any desired mixture with one another.

Conjugated dienes (diolefins) which can be employed in the process according to the invention are e.g. 1,3-butadiene, 1,3-isoprene, 2,3-dimethylbutadiene, 2,4-hexadiene, 1,3-pentadiene and/or 2-methyl-1,3-pentadiene, preferably 1,3-butadiene and/or 1,3-isoprene.

Polar monomers which can be employed in the process according to the invention are e.g. compounds of the formula (V) to (XI)

(V),

(VI),

(VII),

(VIII),

(IX),

(X).

In the formulae (V) to (XI), R can be identical or different and can denote hydrogen, straight-chain and branched alkyl radicals having 1 to 10 C atoms, preferably 1 to 4 C atoms, cycloalkyl radicals having 3 to 20 C atoms and aryl radicals having 6 to 20 C atoms, where alkyl radicals, cycloalkyl radicals and aryl radicals can also contain heteroatoms, such as halogen, oxygen, sulfur or nitrogen, and n can denote 1 to 10.

Compounds of the formula (V) to (XI) are, for example, lactones, such as caprolactone, valerolactone and butyrolactone, lactams, such as caprolactam, valerolactam and butyrolactam, thiolactams, such as thiocaprolactam, thiovalerolactam and thiobutyrolactam, epoxides, such as ethylene oxide, propylene oxide, butene oxide, cyclohexene oxide, styrene oxide and epichlorohydrin, cyclic sulfides, such as ethylene sulfide, propylene sulfide and styrene sulfide, and/or cyclic carbonates, such as ethylene carbonate, propylene carbonate and neo-pentyl carbonate. The lactones are preferably employed, and ε-caprolactone, γ-valerolactone, δ-valerolactone, γ-butyrolactone and β-butyrolactone are to be mentioned as preferred.

Solvents which are employed for the process according to the present invention are inert, aromatic, aliphatic or cycloaliphatic solvents. Suitable solvents are, for example, benzene, toluene, pentane, n-hexane, iso-hexane, heptane and cyclohexane, or halogenated hydrocarbons, such as e.g. methylene chloride and chlorobenzene. The solvents can also be employed as a mixture with one another.

The process according to the present invention is preferably carried out at temperatures from −20 to 200° C., preferably at 0 to 180° C., more preferably at 20 to 160° C.

The process according to the present invention can be carried out under normal pressure or under increased pressure (0.1 to 12 bar).

The process according to the present invention can be carried out discontinuously, semi-continuously and continuously. In the continuous embodiment, it is to be ensured that the polymerization zone of the conjugated dienes is separate from the polymerization zone of the polar monomers and back-mixing of the polar monomers into the polymerization zone of the conjugated dienes is avoided.

In an advantageous embodiment of the block copolymerization, the conjugated dienes are polymerized up to a conversion of ≧50% in a mixture with inert solvent by addition of the catalyst of the rare earth metals while mixing in one or more continuously operated stirred tanks in cascade or in a grafting flow reactor which effects mixing and/or a combination of the two reactor types. The active, non-terminated polymer solution is led to a further polymerization reactor. The block copolymerization is carried out in at least one further stage after addition of the polar monomer to the polydiene solution, with mixing in one or more further continuously operated stirred tanks in cascade or in a grafting flow reactor which effects mixing and/or a combination of the two reactor types. When the desired conversion of polar monomers of ≧30% has been reached, the catalyst can be deactivated by addition of small amounts of, for example, water, carboxylic acids and/or alcohols and the block polymer can be isolated by evaporation of the polymer solution, by precipitation with a non-solvent, such as e.g. methanol, ethanol and acetone, or by steam distillation of the solvent. Additives, such as stabilizers, anti-ageing agents and/or fillers, can be added during the polymerization and during the isolation of the polymer.

It is of course possible for the block copolymer formed to be separated off from homopolymers of the dienes and/or homopolymers of the polar monomers which may have been formed. A suitable process for this separation is e.g. the method of demixing liquids [R. Kuhn, Macromol. Chem., 1976,177,1525; 1980,181, 725].

The block copolymers obtained have an average molecular weight of 5,000 to $10^6$ g/mol. The $T_g$ values are $<-90°$ C., preferably $<-100°$ C.

The particular feature of the block copolymers is that polymers or polymer blocks which are not miscible are coupled to one another by the block copolymer formation. However, the block copolymers obtained here still have the properties of the corresponding individual polymers, for example the same or similar melting and/or glass transition temperatures as occur in the corresponding individual polymers. Due to the use of a non-polar diene and a polar monomer, the block copolymers have an amphiphilic character which can be utilized for dispersing, imparting phases or for coating applications. As a result of the possibility of choosing the ratio between the various monomers in the block copolymer as desired, the polar or non-polar character of the block copolymer can be accurately adjusted as desired.

There are diverse possibilities for the use of the block copolymers. One field of use lies e.g. in the preparation of vulcanizate mixtures with silica for tires and tire components. The block copolymers can be employed as a substitute for the conventional coupling reagents (e.g. Si-69® from Degussa AG) for binding silica fillers to the rubber matrix, where the polydiene part is bound to the rubber matrix and the polymer part of the polar polymer is bound to the silica filler. However, a pure mixture homogenization effect of the block copolymer without vulcanization is also conceivable. The polar polymer part of the block copolymer can, furthermore, itself serve as a filler in a vulcanizate mixture and can be bound to the rubber matrix via the polydiene part, or can merely be admixed.

It is, furthermore, possible to employ the block copolymers as thermoplastic elastomers, the elastomer part being formed by the polymerized polydienes and the thermoplastic part being formed by the polymerized polar monomers.

The block copolymers can moreover be used as a blending material for modification of thermoplastics, for example for improving the impact strength. All thermoplastic materials are in principle possible here, such as, for example, polycarbonates, polyvinyl halides (e.g. PVC), polyamides, polyesters (e.g. PET, PBT), polyethers (e.g. polypropylene oxide, polyethylene oxide), polyacrylates and derivatives thereof (e.g PMMA), polyvinyl acetate or polyoxymethylene.

EXAMPLES

All the polymerization reactions were carried out with exclusion of air and moisture in an inert gas atmosphere using the Schlenk technique. Argon was used as the inert gas.

The solvents n-hexane and cyclohexane are predried over aluminum oxide/silica gel. ε-Caprolactone was obtained from Aldrich, distilled before the polymerization and stored over a molecular sieve 4 Å. Neodymium(III) versatate was employed as a 0.1 M solution in n-hexane. DIBAH was purchased from Aldrich as a 0.1 M solution in a hexane fraction and employed in this form. EASC was obtained as a pure substance from Witco. A 1.0 M EASC solution in n-hexane was prepared from this. The technical-grade methanol used for precipitation of the polymer originated from Kraemer & Martin GmbH. Bayer AG provided the stabilizer 2,2'-methylene-bis-(4-methyl-6-tert-butylphenol) (Vulkanoxe BKF).

The IR measurements were carried out on an IR spectrometer: BOMEM-Arid Zone™. The polymers were swollen in carbon disulfide and then applied as thin films between two potassium bromide plates and measured. The microstructure of the polybutadiene samples was determined as described in the literature [M. Kraft in Struktur und Absorptionsspektroskopie der Kunststoffe [Structure and Absorption Spectroscopy of Plastics], VCH, Weinheim, 1973, p. 93, E. O. Schmalz, W. Kimmer, Z. Anal. Chem. 1961,181, 229.].

The polymer samples for the GPC were employed for the measurement as tetrahydrofuran solutions with a concentration of 1 mg·ml$^{-1}$. Before the measurement, the THF solutions were filtered through a 0.2 μm syringe filter. Calibration of the GPC was carried out with 1,4-polybutadiene standards from Fluka. The 1,4-polybutadiene standards of weights 2,000, 5,000, 20,000, 30,000, 66,000, 160,000, 200,000, 300,000 and 800,000 g·mol$^{-1}$ were used for the calibration. GPC unit: Thermo Separation® Products. Column set: 3× PL gel 10 p Mixed-B. RI detector: Shodex RI 74. Eluent: THF; flow rate: 1.0 ml/min.

The conversions were determined gravimetrically; for this, the polymer solutions were weighed after sampling (still with solvent and monomer) and after drying (at 65° C. in a vacuum drying cabinet).

The polymers were separated in accordance with the principle of demixing liquids [R. Kuhn, Macromol. Chem., 1976,177,1525; 1980,181, 725]. In a 500 ml three-necked flask with a precision glass stirrer and reflux condenser, 1.0 to 1.2 g of polymer were heated under reflux for two hours with the addition of approx. 1 mg of stabilizer (2,2'-methylene-bis(4-methyl-6-cyclohexylphenol)) in a solvent mixture of 120 ml DMF and 180 ml MCH. The solution was transferred to centrifuge glasses and centrifuged at a speed of 3,000 min$^{-1}$ for 18 hours. The centrifugation was carried out at 60° C. for the first hour and then at 25° C. The upper phase was then sucked off with a pipette and the lower phase was separated off from the middle phase via the bottom opening of the centrifuge glass. All the phases were transferred to separate glass flasks and the solvent was distilled off in vacuo. The polymers which remained were dried in flasks overnight in a vacuum drying cabinet at 125° C. The individual percentage contents by weight in the phases could be determined by weighing.

The NMR measurements were carried out on a nuclear magnetic resonance spectrometer from Bruker, carrier frequency ($^1$H-NMR): 400.13 MHz, solvent CDCl$_3$, standard: tetramethylsilane ($\delta$=0.00 ppm), measurement temperature: 298 K.

Polymerization experiments:

Autoclave bottles: In-house production of Bayer AG, 200 ml thick-walled glass bottle with metal attachment, Teflon seal and safety spring. 2 l glass autoclave: Buchi laboratory autoclave BEP 280 with U-shaped stirrer.

Examples 1 to 4

Polymerization Procedure (Autoclave):

Before the experiment, the autoclave (2 liter glass autoclave, Buchi laboratory autoclave BEP 280) was heated thoroughly in vacuo at 90° C. and secured. By applying a reduced pressure, 1 l of solvent was sucked into the autoclave under argon via a cannula. The autoclave was temperature-controlled at 60° C. The addition of 1,3-butadiene was then carried out via a septum. The catalyst reagents neodymium(III) versatate (0.1 molar solution in hexane), diisobutylaluminium hydride (0.1 molar solution in hexane) and ethylaluminium sesquichloride (1 molar solution in hexane) were then added. For the conversion/time measurement series, samples of the reaction mixture were taken via a globe stop-cock at certain intervals of time. The reaction of these samples was stopped with MeOH (+Vulkanox® BKF). The butadiene polymerization ran up to high conversions; the polar comonomer ($\epsilon$-caprolactone, methyl acrylate or vinyl propyl ether) was then added. Further samples were then taken for the conversion/time determination. At the end of the experiment, the residual of the reaction mixture remaining in the autoclave was poured into methanol/Vulkanox® BKF and the polymerization was stopped in this manner. The polymer samples taken were dried overnight at 65° C. in a vacuum drying cabinet.

TABLE 1

| | Examples 1 to 4 | | | |
|---|---|---|---|---|
| Example | 1 | 2 | 3 | 4 |
| Solvent | cyclohexane | n-hexane | n-hexane | n-hexane |
| Solvent | 1000 ml | 419 ml | 436 ml | 428 ml |
| Butadiene | 190 g | 47.7 g | 44.4 g | 46.6 g |
| Nd (versatate)$_3$ | 0.4 mmol | 0.17 mmol | 0.17 mmol | 0.17 mmol |
| DIBAH | 8 mmol | 8.5 mmol | 5.1 mmol | 1.7 mmol |
| EASC | 0.27 mmol | 0.17 mmol | 0.17 mmol | 0.17 mmol |
| Butadiene polymerization | | | | |
| Temperature | 60° C. | 60° C. | 60° C. | 60° C. |
| Time | 67 min | 90 min | 115 min | 123 min |
| Butadiene conversion | 95% | 100% | 100% | 100% |
| Block copolymerization | | | | |
| Active BR solution | 1190 g | 280.1 g | 267.7 g | 270.6 g |
| Comonomer | $\epsilon$-caprolactone | $\epsilon$-caprolactone | $\epsilon$-caprolactone | $\epsilon$-caprolactone |
| Comonomer | 182 g | 51.5 g | 51.5 g | 51.5 g |
| Temperature | 60° C. | 60° C. | 60° C. | 60° C. |

TABLE 1-continued

| | Examples 1 to 4 | | | |
|---|---|---|---|---|
| Example | 1 | 2 | 3 | 4 |
| Time | 118 min | 80 min | 128 min | 110 min |
| Comonomer conversion | 59.9% | 100% | 100% | 100% |
| Polymer (total) | 289 g | 92.9 g | 87.6 g | 90.3 g |

Example 1

Separation of the Copolymer+Analysis:

The copolymer was separated by the method of demixing liquids, it being possible for the block copolymer to be isolated at the phase boundary with a total weight content of 10 wt. % of the total polymer in the case of the experiment with the polar monomer $\epsilon$-caprolactone.

In the IR and in the $^1$H-NMR, the block copolymer isolated showed the signals of the two polymerized monomers:

Poly($\epsilon$-Caprolactone) Content in the Block Copolymer

IR: $\upsilon$=713 (w), 732 (w), 754 (w), 842 (w), 934 (w), 962 (w), 1048 (m), 1067 (w), 1108 (m), 1191 (s), 1244 (s), 1295 (m), 1367 (m), 1397 (w), 1420 (w), 1437 (w), 1471 (w), 1634 (w), 1726 (s), 2866 (m), 2944 (s).

$^1$H-NMR (CDCl$_3$): $\delta$=1.37 (m, 2H, 4-CH$_2$), 1.65 (m, 4H, 3.5-CH$_2$), 2.31 (t, $^3J_{HH}$=7.5 Hz, 2H, O—COCH$_2$), 4.06 (t, $^3J_{HH}$=6.7 Hz, 2H, COOCH$_2$).

cis-1,4-Poly(Butadiene) Content in the Block Copolymer

IR: $\upsilon$=737 (s), 778 (w), 911 (w), 965 (w), 993 (m), 1019 (w), 1093 (w), 1161 (w), 1238 (w), 1260 (w), 1308 (m), 1402 (m), 1432 (s), 1451 (s), 1656 (s), 1738 (w), 2852 (s), 2938 (s), 3006 (s).

$^1$H-NMR (CDCl$_3$):$\delta$=2.08 (m, 4H, CH$_2$), 5.38 (m, 2H, CH).

To rule out the possibility that only two homopolymers (polybutadiene and poly-$\epsilon$-caprolactone) are formed in the polymerization, after the separation with demixing liquids a GPC analysis of the fractions obtained was carried out, this showing that the GPC signal of the block copolymer is in the highest molecular weight range.

The average molecular weight was approx. 300,000 g/mol, the T$_g$ value was −103° C. The diene content was 30 wt. %, the content of polar monomers was 70 wt. %. The cis-1,4 content in the diene block was 96%.

Further evidence of the formation of block copolymers was obtained from the morphology of the polymer. For this, the block copolymer was analysed by transmission electron microscopy (TEM) (FIG. 2) and the morphology thereof was compared with a cis-1,4-polybutadiene/poly-$\epsilon$-caprolactone blend which was prepared (FIG. 1). For this, 0.90 g poly-$\epsilon$-caprolactone and 0.55 g cis-1,4-polybutadiene were dissolved in 1 l CHCl$_3$ by stirring in a 2 l round-bottomed flask. The polymer mixture was precipitated in 500 ml MeOH (+0.1 g Vulkanox® BKF) and then dried in a vacuum drying cabinet at 50° C.

Comparative Examples 5 to 7

Polymerization Procedure (Autoclave):

The polymerization was carried out analogously to Examples 1 to 4. The reaction quantities and the results are summarized in Table 2.

TABLE 2

Comparative examples 5 to 7

| Example | 5 | 6 | 7 |
|---|---|---|---|
| Solvent | n-hexane | cyclohexane | cyclohexane |
| Solvent | 434 ml | 1000 ml | 1000 ml |
| Butadiene | 46.5 g | 120 g | 120 g |
| Nd (versatate)$_3$ | 0.17 mmol | 0.2 mmol | 0.2 mmol |
| DIBAH | 8.5 mmol | 4 mmol | 4 mmol |
| EASC | 0.17 mmol | 0.13 | 0.13 |
| Butadiene polymerization | | | |
| Temperature | 60° C. | 60° C. | 60° C. |
| Time | 120 min | 83 min | 260 min |
| Butadiene conversion | 100% | 93% | 99% |
| Block copolymerization | | | |
| Active BR solution | 275.0 g | 1200 g | 1200 g |
| Comonomer | octamethyl cyclotetrasiloxane | methyl acrylate | vinyl propyl ether |
| Comonomer | 72.1 g | 190 g | 200 g |
| Temperature | 60° C. | 60° C. | 60° C. |
| Time | 168 min | 252 min | 200 min |
| Comonomer conversion | not detectable | not detectable | not detectable |
| Polymer (total) | 37.5 g | 112 g | 119 g |

What is claimed is:

1. Block copolymers based on conjugated dienes and polar monomers, wherein the block copolymers comprise the polymerized conjugated dienes in amounts of 5 to 95 wt. % and the polymerized polar monomers in amounts of 95 to 5 wt. %, the polymerized dienes having a cis-1,4 content of ≧60 wt. %, wherein the polar monomers are selected from the group consisting of lactones, lactam, thiolactams, epoxides, cyclic sulfides and cyclic carbonates.

2. Block copolymers according to claim 1, wherein said conjugated dienes are selected from the group consisting of 1,3-butadiene, 1,3-isoprene, 2,3-dimethylbutadiene, 2,4-hexadiene, 1,3-pentadiene and/or 2-methyl-1,3-pentadiene.

3. Block copolymers according to claim 1, wherein said polar monomers are selected from the group consisting of ε-caprolactone, γ-valerolactone, δ-valerolactone, γ-butyrolactone and/or β-butyrolactone.

4. A thermoplastic elastomer containing block copolymers based on conjugated dienes and polar monomers which comprise the polymerized conjugated dienes in amounts of 5 to 95 wt. % and the polymerized polar monomers in amounts of 95 to 5 wt. %, the polymerized dienes having a cis-1,4 content of ≧60 wt. %, wherein the polar monomers are selected from the group consisting of lactones, lactams, thiolactams, epoxides, cyclic sulfides and cyclic carbonates.

5. A blend material for the modification of thermoplastics comprising block copolymers based on conjugated dienes and polar monomers which comprise the polymerized conjugated dienes in amounts of 5 to 95 wt. % and the polymerized polar monomers in amounts of 95 to 5 wt. %, the polymerized dienes having a cis-1,4 content of ≧60 wt. %, wherein the polar monomers are selected from the group consisting of lactones, lactams, thiolactams, epoxides, cyclic sulfides and cyclic carbonates.

* * * * *